United States Patent
Chiu

(10) Patent No.: US 11,199,320 B1
(45) Date of Patent: Dec. 14, 2021

(54) HEAT DISSIPATION STRUCTURE CAPABLE OF MULTIPLE AND DIFFERENTIAL TEMPERATURE CONTROL, METHOD, AND ELECTRONIC DEVICE USING SAME

(71) Applicants: HONG FU TAI PRECISION ELECTRONS (YANTAI) CO., LTD., Yantai (CN); HON HAI PRECISION INDUSTRY CO., LTD., New Taipei (TW)

(72) Inventor: Tsung-Je Chiu, New Taipei (TW)

(73) Assignees: HONG FU TAI PRECISION ELECTRONS (YANTAI) CO., LTD., Yantai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 16/934,817

(22) Filed: Jul. 21, 2020

(30) Foreign Application Priority Data

Jun. 3, 2020 (CN) .......................... 202010496212.9

(51) Int. Cl.
*G03B 21/16* (2006.01)
*F21V 29/503* (2015.01)
*F21V 29/52* (2015.01)
*F21V 29/70* (2015.01)
*F21V 29/67* (2015.01)
*F21Y 115/10* (2016.01)

(52) U.S. Cl.
CPC ............ *F21V 29/503* (2015.01); *F21V 29/52* (2015.01); *F21V 29/67* (2015.01); *F21V 29/70* (2015.01); *F21Y 2115/10* (2016.08)

(58) Field of Classification Search
None
See application file for complete search history.

(56) References Cited

U.S. PATENT DOCUMENTS

2018/0059521 A1* 3/2018 Nishimori ............ G03B 21/204
2020/0301265 A1* 9/2020 Yan ...................... H04N 9/3161

* cited by examiner

*Primary Examiner* — Elmito Breval
(74) *Attorney, Agent, or Firm* — ScienBiziP, P.C.

(57) ABSTRACT

A heat dissipation structure capable of holding different components at different temperatures within one housing includes at least first and second elements, a refrigerator, and a heat dissipation device. The refrigerator is positioned adjacent to the first element. The refrigerator forms a first heat dissipation channel to dissipate heat from the first element requiring a first target temperature. The dissipation device forms a second heat dissipation channel to dissipate heat from the second element requiring a second target temperature, the first target temperature being higher than the second target temperature.

13 Claims, 3 Drawing Sheets

HEAT DISSIPATION STRUCTURE CAPABLE OF MULTIPLE AND DIFFERENTIAL TEMPERATURE CONTROL, METHOD, AND ELECTRONIC DEVICE USING SAME

FIELD

The subject matter herein generally relates to temperature control, and particularly to a heat dissipation structure, method, and electronic device using the heat dissipation structure.

BACKGROUND

An electronic device generally has one or more heat-conducting type of heat dissipation structures, such as a heat sink or a fan, to dissipate heat from multiple components positioned inside the electronic device. However, such multiple components can only be controlled to be one target temperature.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

Figure 1:
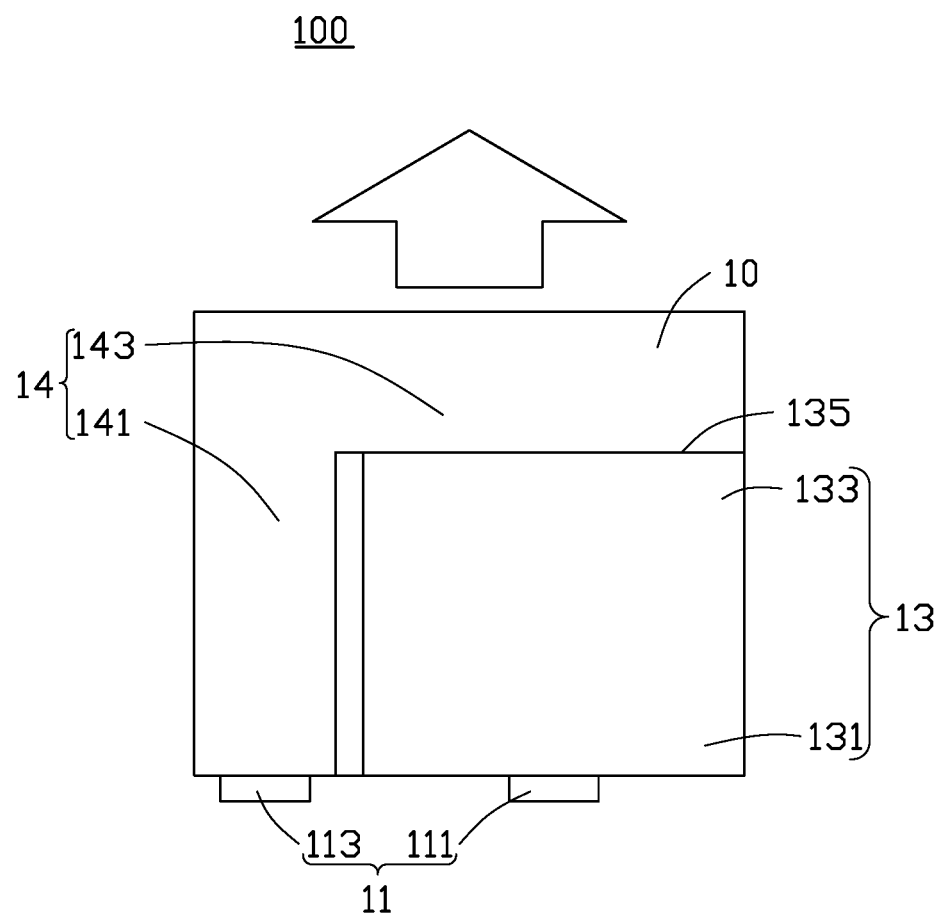
FIG. 1 is a schematic view of an electronic device using a heat dissipation structure in a first exemplary embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series, and the like.

FIG. 1 illustrates a first embodiment of an electronic device 300. The electronic device 100 includes a heat dissipation structure 10. The heat dissipation structure 10 dissipates heat from components in the electronic device 100. The electronic device 100 can be a projector, a computer, and the like. In this embodiment, the electronic device 100 is a projector.

The heat dissipation structure 10 includes at least one component 11 from which heat needs to be dissipated, a refrigerator 13, and a heat dissipation device 14. The refrigerator 13 and the heat dissipation device 14 dissipate heat from component 11.

The at least one component 11 includes a first element 111 and a second element 113. In this embodiment, the first element 111 and the second element 113 are both one in number. The first element 111 requires a higher temperature and needs to operate at a first target temperature. The second element 113 requires a lower temperature and needs to operate at a second target temperature. The first target temperature is higher than the second target temperature. In another embodiment, each of the first target temperature and the second target temperature can be a temperature range or a fixed value. The temperature value or the temperature range corresponding to the first target temperature is higher than the temperature value or temperature range corresponding to the second target temperature.

In this embodiment, the first element 111 and the second element 113 are light emitting diodes in a light source device of the projector. The first element 111 is a blue light emitting diode, the first target temperature applicable thereto is about 65° C. to 70° C. The second element 113 is a red light emitting diode or a green light emitting diode, and the second target temperature applicable thereto is about 45° C.

The refrigerator 13 is positioned adjacent to the first element 111. The refrigerator 13 forms a first heat dissipation channel to dissipate heat from the first element 111 thereby controlling the first element 111 to be at the first target temperature. The refrigerator 13 includes a first end 131 for cooling the first element and a second end 133 for dissipating the heat collected from the first end 131. The first end 131 is positioned adjacent to the first element 111. The heat second end 133 is positioned adjacent to the heat dissipation device 14. A heat conductive surface 135 is formed between the second end 133 and the heat dissipation device 14. The heat conductive surface 135 has an intermediate temperature. The intermediate temperature is higher than the second target temperature but lower than the first target temperature. In this embodiment, the refrigerator 13 is a semiconductor refrigerator.

The heat dissipation device 14 is positioned adjacent to the at least one component 11 and the refrigerator 13. The heat dissipation device 14 forms a second heat dissipation channel to dissipate heat from the second element 113 thereby controlling the second element to be the second target temperature. The heat dissipation device 14 is a combination of at least one of a heat sink, a fan, and a heat pipe.

In this embodiment, the heat dissipation device 14 includes a plurality of heat sinks. The heat sinks are stacked to form an end portion 141 and a connecting portion 143 connected to the end portion 141. The end portion 141 is positioned adjacent to the second elements 113. The connecting portion 143 is positioned adjacent to the refrigerator 13.

Figure 2:
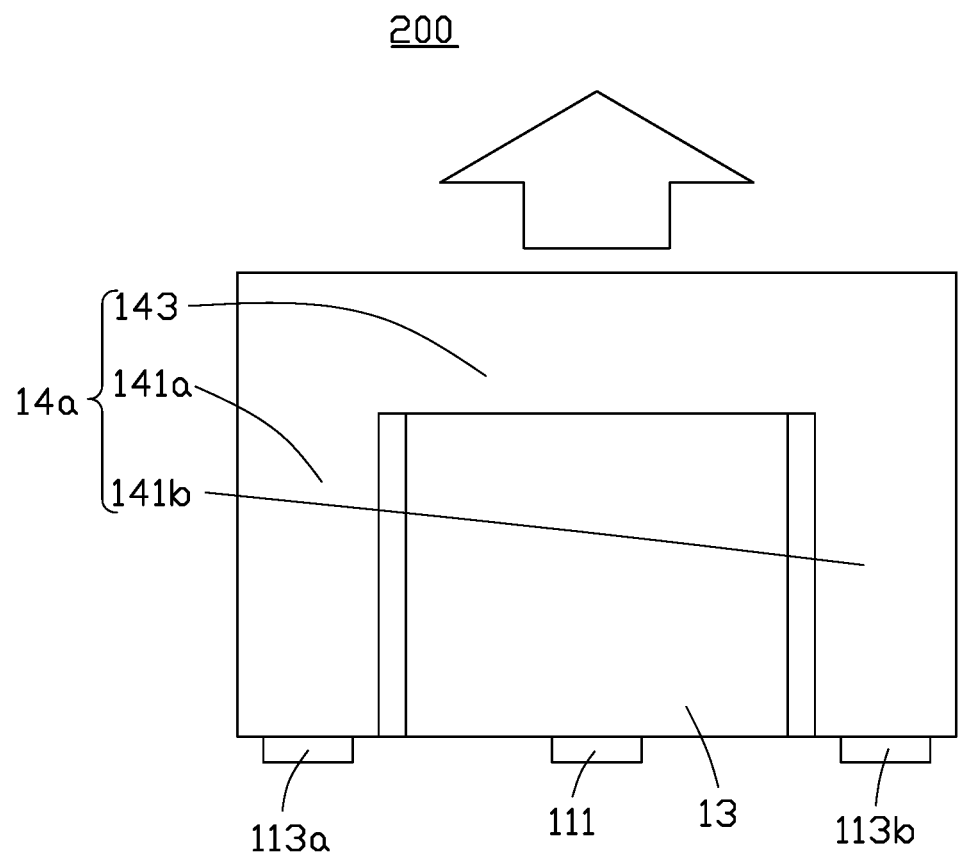
FIG. 2 is a schematic view of an electronic device using a heat dissipation structure in a second exemplary embodiment.

FIG. 2 illustrates a second embodiment of an electronic device 200. The structure and working principle of the electronic device 200 are substantially the same as the electronic device 100. The differences between the electronic device 200 and the electronic device 100 are that the electronic device 200 includes two second elements 113a and 113b. For example, the second elements 113a and 113b can be red light emitting diodes or green light emitting diodes. The two second elements 113a and 113b have the same temperature value or the same temperature range, both being the second target temperature. Correspondingly, the electronic device 200 further includes a heat dissipation device 14a. The heat dissipation device 14a includes two end portions 141a, 141b and a connecting portion 143 connected to the two end portions 141a, 141b. The two end portions 141a, 141b are positioned adjacent to the second elements 113a and 113b, and the connecting portion 143 is positioned adjacent to the refrigerator 13.

In another embodiment, the number of second elements 113 can be greater than two, as long as the second target temperature is constant and uniform, being the same temperature value or the same temperature range. Accordingly, the number of heat dissipation devices 14 or the number of end portions 141 is increased to control the second elements 113 to be at the second target temperature.

When the second target temperature is a temperature range, for example, 20° C. to 40° C., the second target temperature can include a plurality of second sub-target temperatures. Each second element 113 corresponds to one different second sub-target temperature. For example, the second sub-target temperature of one second element 113 is 25° C., and the second sub-target temperature of the other second element 113 is 20° C., thereby realizing stable control of different temperatures of the second elements 113. The different second sub-target temperatures can be achieved by changing the number of heat dissipation devices 14 (for example, increasing or decreasing the number of heat sinks) or by adjusting a setting of the heat dissipation devices 14 (for example, adjusting the distance between the fan and the second elements 113).

In another embodiment, the number of first elements 111 may be increased, as long as the first target temperature is to be uniform, at the same temperature value or the same temperature range. Accordingly, the number of refrigerators 13 can be increased to control the first elements 111 to be at the first target temperature.

When the first target temperature is a temperature range, for example, 65° C. to 70° C., the first target temperature can include multiple first sub-target temperatures. Each first element 111 corresponds to one different first sub-target temperature. For example, the first sub-target temperature of one first element 111 is 65° C., and the first sub-target temperature of the other first element 111 is 70° C., thereby realizing stable control of different temperatures of the first elements 111. The different first sub-target temperatures can be achieved by changing the number of refrigerators 13 (for example, increasing or decreasing the number of refrigerators 13) or by adjusting a setting (for example, adjusting a distance between the refrigerator 13 and the first elements 111).

Figure 3:
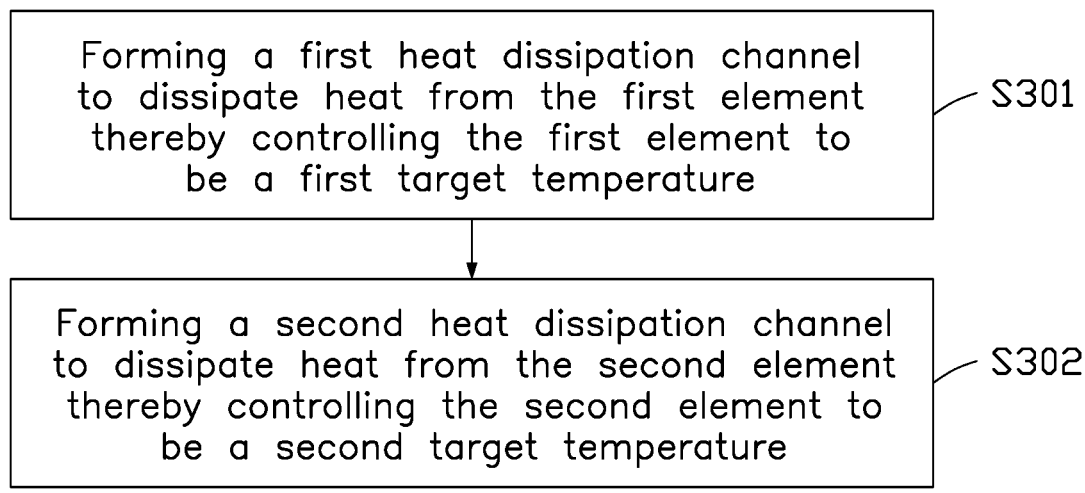
FIG. 3 is a flow chart of a heat dissipation method, according to an exemplary embodiment.

FIG. 3 illustrates a flow chart of a heat dissipation method, according to an exemplary embodiment. The heat dissipation method is configured for dissipating heat from the at least one component 11. The at least one component 11 includes a first element 111 and a second element 113. The heat dissipation method is as follows.

At block S301, a first heat dissipation channel is formed to dissipate heat from the first element 111 thereby controlling the first element 111 to be at a first target temperature.

At block S302, a second heat dissipation channel is formed to dissipate heat from the second element 113 thereby controlling the second element 113 to be at a second target temperature. The first target temperature is higher than the second target temperature.

A conductive surface 135 is formed between the first heat dissipation channel and the second heat dissipation channel. The conductive surface 135 has an intermediate temperature that is higher than the second target temperature but lower than the first target temperature.

In other embodiment, when the number of the first elements 111 is more than one, the first target temperature includes a plurality of first sub-target temperatures, and the number of the refrigerator 13 is increased to form a plurality of first heat dissipation branch, configured to dissipating heat form each first element 111 thereby controlling each first element 111 to be one different first sub-target temperature.

In other embodiment, when the number of the second elements 113 is more than one, the first target temperature includes a plurality of the second sub-target temperatures. The number of the heat dissipation device 14 is increased to form a plurality of second sub-heat dissipation branch, configured to dissipating heat form each second element 113, thereby controlling each second element 113 to be one different second sub-target temperature.

The heat dissipation structure 10, the method and the electronic devices 100, 200 form the different heat dissipation channels for dissipating heat for the first element 111 and the second element 113 to control the first element 111 and the second element 113 to be the first target temperature and the second target temperature, respectively, thereby achieving the different temperature control for different elements.

In addition, the heat dissipation structure 10 can realize the further different temperatures for multiply first elements 111 and second elements 113 by increasing the number of the refrigerators 13 and the heat dissipation devices 14.

The embodiments shown and described above are only examples. Many additional details are often found in the art, and many such additional details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will, therefore, be appreciated that the embodiments described above may be modified within the scope of the claims.

What is claimed is:

1. A heat dissipation structure comprising:
 at least one component, wherein the at least one component comprises a first element and a second element;
 a refrigerator, positioned adjacent to the first element, wherein the refrigerator forms a first heat dissipation channel to dissipate heat from the first element thereby controlling the first element to be at a first target temperature; and
 a heat dissipation device, positioned adjacent to the at least one component and the refrigerator, wherein the dissipation device forms a second heat dissipation channel to dissipate heat from the second element thereby controlling the second element to be at a second target temperature, the first target temperature is higher than the second target temperature;
 wherein the refrigerator comprises a second end for dissipating heat, a heat conductive surface is formed between the second end and the heat dissipation device, the heat conductive surface has an intermediate temperature, the intermediate temperature is higher than the second target temperature but lower than the first target temperature.

2. The heat dissipation structure of claim 1, wherein the refrigerator further comprises a first end for cooling the first element, the first end is positioned adjacent to the first element, the second end is positioned adjacent to the heat dissipation device and is configured for dissipating the heat collected from the first end.

3. The heat dissipation structure of claim 1, wherein the refrigerator is a semiconductor refrigerator.

4. The heat dissipation structure of claim 1, wherein the heat dissipation device is a combination of at least one of a heat sink, a fan, and a heat pipe.

5. The heat dissipation structure of claim 1, wherein the first element is a blue light emitting diode, the second element is one of a red light emitting diode and a green light emitting diode.

6. The heat dissipation structure of claim 1, wherein the first target temperature is 65° C. to 70° C., the second target temperature is 45° C.

7. A heat dissipation method, configured for dissipating heat from at least one component, wherein the at least one component comprises a first element and a second element, the method comprising:
    forming a first heat dissipation channel to dissipate heat from the first element thereby controlling the first element to be at a first target temperature; and
    forming a second heat dissipation channel to dissipate heat from the second element thereby controlling the second element to be at a second target temperature;
    wherein a heat conductive surface is formed between the second end and the heat dissipation device, the heat conductive surface has an intermediate temperature, the intermediate temperature is higher than the second target temperature but lower than the first target temperature.

8. An electronic device, comprising:
    a heat dissipation structure comprising:
        at least one component, wherein the at least one component comprises a first element and a second element;
        a refrigerator, positioned adjacent to the first element, wherein the refrigerator forms a first heat dissipation channel to dissipate heat from the first element thereby controlling the first element to a first target temperature; and
        a heat dissipation device, positioned adjacent to the at least one component and the refrigerator, wherein the dissipation device forms a second heat dissipation channel to dissipate heat from the second element thereby controlling the second element to be at a second target temperature, the first target temperature is higher than the second target temperature;
    wherein the refrigerator comprises a second end for dissipating heat, a heat conductive surface is formed between the second end and the heat dissipation device, the heat conductive surface has an intermediate temperature, the intermediate temperature is higher than the second target temperature but lower than the first target temperature.

9. The electronic device of claim 8, wherein the refrigerator further comprises a first end for cooling the first element, the first end is positioned adjacent to the first element, the heat second end is positioned adjacent to the heat dissipation device and is configured for dissipating the heat collected from the first end.

10. The electronic device of claim 8, wherein the refrigerator is a semiconductor refrigerator.

11. The electronic device of claim 8, wherein the heat dissipation device is a combination of at least one of a heat sink, a fan, and a heat pipe.

12. The electronic device of claim 8, wherein the first element is a blue light emitting diode, the second element is one of a red light emitting diode and a green light emitting diode.

13. The electronic device of claim 8, wherein the first target temperature is 65° C. to 70° C., the second target temperature is 45° C.

* * * * *